United States Patent [19]

Bergstein

[11] Patent Number: 5,141,332
[45] Date of Patent: Aug. 25, 1992

[54] AIR TEMPERATURE MONITOR

[76] Inventor: David M. Bergstein, 2708 Georgia La., Chino Valley, Ariz. 86323

[21] Appl. No.: 722,543

[22] Filed: Jun. 20, 1991

[51] Int. Cl.⁵ .................. G01W 1/02; G01K 13/02
[52] U.S. Cl. .................. 374/135; 73/170 R; 324/457; 340/601
[58] Field of Search .......... 374/135, 109, 132, 115; 73/170 R

[56] References Cited

U.S. PATENT DOCUMENTS

| | | |
|---|---|---|
| 2,084,370 | 6/1937 | Zumwalt . |
| 2,250,231 | 7/1941 | Nodine . |
| 2,270,211 | 1/1942 | Bruns . |
| 2,283,248 | 5/1942 | Frese . |
| 2,290,328 | 7/1942 | Hedfield et al. . |
| 2,329,685 | 9/1943 | Baker . |
| 2,959,958 | 11/1960 | Savet ........................... 374/135 X |
| 3,326,045 | 6/1967 | Vrsaljko ........................ 374/109 |
| 3,348,414 | 10/1967 | Waters et al. ................. 374/115 |
| 3,907,606 | 9/1975 | Chang . |
| 4,881,822 | 11/1989 | Ridenour ...................... 374/208 X |

OTHER PUBLICATIONS

J. Y. Wang & C. M. M. Felton, Instruments for Phycical Environmental Measurements, 1983, pp. 129-130.
D. A. Robinson, U.S. Cooperative Climate-Observing Systems: Reflections and Recommendations, Jun. 1990, pp. 826-828.
S. Negri, Sensors May be Flawed, The Arizona Republic, Oct 10, 1990.
An Intercomparison of Radiation Shields for Auto Stations, D. J. McKay and J. D. McTaggart Cowan, World Meterological Organization Abstract from a Meeting in Geneva, Switzerland, Jul. 1977, pp. 208-213.

Primary Examiner—Daniel M. Yasich
Attorney, Agent, or Firm—Frost & Jacobs

[57] ABSTRACT

A temperature monitor comprising two circular metallic plates which are disposed in the horizontal plane in a spaced-apart configuration, the upper plate having a mirrored top surface and a black bottom surface, the lower plate having a black top surface and a mirrored bottom surface, and a temperature sensor mounted in the space between the two plates. The plates are fastened in the spaced-apart configurataion by use of nylon bolts, and the temperature sensor is mounted using nylon or other electrically insulating washers. The entire apparatus is mounted on wood or PVC supports. A thin layer of temperature-stabilized air is traped in between the two plates, allowing the temperataure sensor to achieve great accuracy.

12 Claims, 2 Drawing Sheets

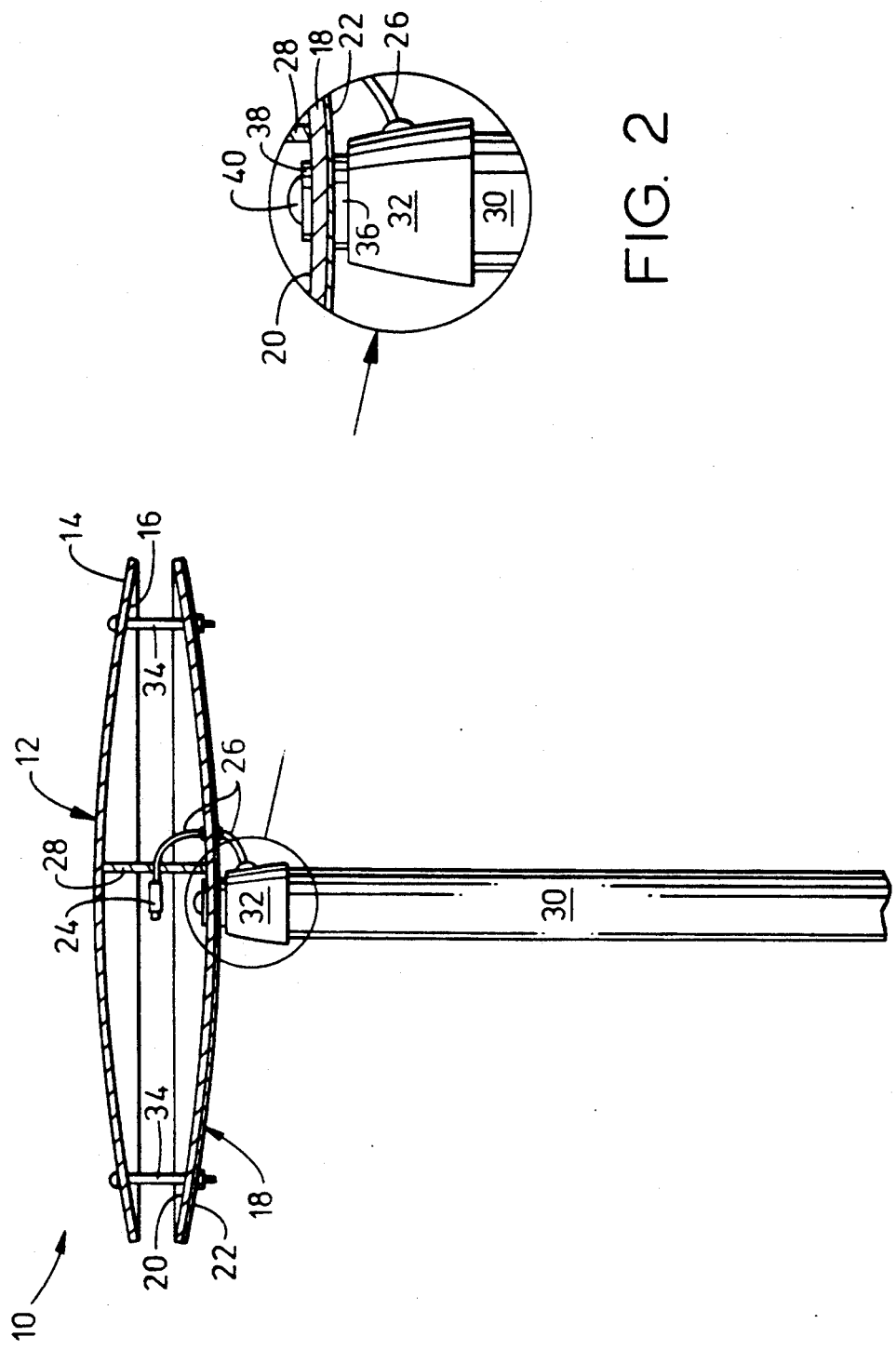

AIR TEMPERATURE MONITOR

TECHNICAL FIELD

The present invention relates generally to temperature monitors and is particularly directed to stabilized air temperature measuring devices. The invention will be specifically disclosed in connection with parallel, spaced-apart circular metallic plates and a temperature sensor located in the space between the plates. The surfaces of the plates that face away from the temperature sensor consist of a mirrored finish, and the surfaces of the plates that face toward the temperature sensor are painted black.

BACKGROUND OF THE INVENTION

Temperature measurements of air are important in many situations, particularly when temperature data is being gathered for weather information. The historic method for acquiring air temperature data is to read a mercury-type thermometer, then record that datum value. The more modern method for acquiring such temperatures is to use an electronic sensor and then have the corresponding value logged into some type of recording device or electronic memory.

Once an electronic temperature sensor is utilized, the datum value can be automatically recorded, either locally, or via a communication link to a remote recording device. The major problem in the use of electronic temperature sensors is that, in many cases, they have proven to be inaccurate when measuring air temperature. Once example of such an inaccurate device is a $5000 electronic thermometer used by the National Weather Service in Tuscon, Ariz., which gives readings that are two degrees too warm during the day and one-half degree too cool during the night.

Another problem in the use of electronic temperature sensors is the design of the construction of many of the present temperature sensing installations. A popular device at the present time is a thermistor-based Maximum-Minimum Temperature System (MMTS), which is mounted in a small "beehive-like" structure. The MMTS is presently used by about half of the cooperative stations that observe temperature in the United States. Unfortunately, the MMTS stations give different readings than the previously used liquid-in-glass maximum and minimum thermometers mounted in Cotton Region Shelters (CRS). Such differences in readings are probably due to the different microenvironments within the CRS shelters.

An additional problem in the use of MMTS stations is that their durability and reliability have been low. Over the past six years there have been as many reported MMTS malfunctions as there are units installed. Some reasons given for such malfunctions are lightning strikes, animals cutting buried cables, and insects nesting in the shelter (which would ruin the airflow through the beehive-like shelter, which is necessary for its proper function).

An unusual temperature sensing device was disclosed in the book *Instruments for Physical Environmental Measurements*, by J. Y. Wang and Catherine M. M. Felton (1983). This device, referred to as a Reflecting Disc Shield, consists of two parallel reflecting disks with a temperature sensor located between the disks. The surfaces of the disks that face the temperature sensor are painted black, and the surfaces that face away from the sensor are painted white. The disks act as heat sinks and tend to stabilize the air temperature measurements, without artificial ventilation.

The Reflecting Disc Shield, as disclosed by Wang and Felton, has a theoretical accuracy of $\pm 0.5°$ F. Data taken from actual units built according to this disclosure exhibit somewhat different characteristics, however, having an inaccuracy of 5.0 degrees F. at minimum temperature during the night, and an inaccuracy of 2.0° F. at maximum temperature during the day.

SUMMARY OF THE INVENTION

Accordingly, it is a primary object of the present invention to provide an air temperature monitor having great accuracy at both maximum temperature during daylight and minimum temperature during the night.

It is another object of the present invention to provide an air temperature monitor which is highly reliable in operation and of simple construction so as to minimize the cost, yet not sacrifice its great accuracy in measuring maximum and minimum daily temperatures.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved air temperature monitor is provided for measuring instantaneous air temperature, as well as maximum and minimum daily air temperatures with great accuracy. The monitor includes a set of disks, which contains an electronic temperature sensing element located between the disks. The surfaces of each disk that face the temperature sensor are painted black, and the surfaces of each disk that face away from the sensor have a mirrored finish for maximum reflectivity.

According to another aspect of the present invention, the air temperature monitor consists of two convex parallel plates, which are made of conductive material. The convex plates are nearly flat, however, the distance between the plates is at a minimum along their edges, and at a maximum at their centers. The plates are mounted on a pole made of electrically insulating material, so that the plates are electrically isolated from ground. The plates are also electrically isolated from the temperature sensor and from each other by the use of electrically insulative mounting hardware. The top surface of the upper plate consists of a thin layer of metalized Mylar or Lexan having a mirror finish which is mounted onto the conductive upper plate. The bottom surface of the upper plate consists of black glossy paint. The top surface of the lower plate also consists of black glossy paint, and the bottom surface of the lower plate consists of a thin layer of metalized Mylar or Lexan having a mirror finish which is mounted onto the conductive lower plate.

In a further aspect of the invention, the air temperature monitor assembly is mounted on a solar tracking system such that the parallel convex plates are always facing the sun during periods of clear sky in daylight. The tracking system is maneuverable in both azimuth and declination.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1 is an elevational view in partial cross-section of an Air Temperature Monitor built in accordance with the present invention.

FIG. 2 is an enlarged view of a portion of FIG. 1, showing details of the center mounting construction.

Figure 4:
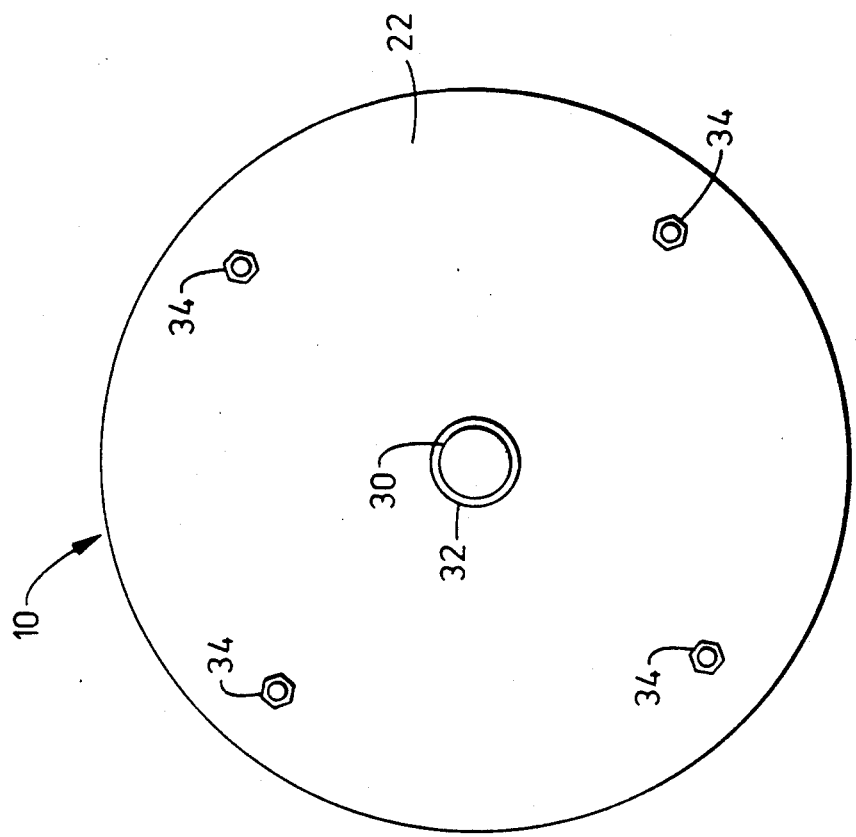
FIG. 4 is a bottom view of an Air Temperature Monitor built in accordance with the present invention.

Reference will now be made in detail to the present preferred embodiment of the invention, an example of which is illustrated in the accompanying drawings.

DETAILED DESCRIPTION OF THE PREFERRED EMBODIMENT

Referring now to the drawings, FIG. 1 shows an air temperature air monitor generally designated by the numeral 10 constructed in accordance with the present invention. The device 10 includes two convex plates which are oriented in a parallel arrangement, such that the upper plate 12 is approximately parallel to the lower plate 18. The use of the term parallel is used somewhat loosely, since the bulges in the two convex-shaped plates do not follow each other in a parallel manner, but instead the bulges aim away from each other. In other words, the bulge in the upper plate 12 is at a higher elevation than the rims of the plate 12, and the bulge at the center of the lower plate 18 is lower in elevation than the rims of the lower plate 18. The length of the air gap between the two plates is at a minimum around the edges of the circumference of the two plates 12 and 18, and the length of the air gap is at a greater, maximum length at the center of the two plates 12 and 18. In the preferred embodiment, the air gap distance between the two plates is approximately one inch around the outer rim circumference of the two plates 12 and 18, and 1½ to 2" at the center of the two plates 12 and 18.

The upper plate 12 is coated with a thin layer 14 of metalized Mylar or metalized Lexan on its top surface. Metalized Lexan, about 0.015" thick is preferred. This is used in order to achieve maximum reflectivity of light. On the other hand, the bottom surface 16 of the upper plate 12 is coated with a black finish, which is a glossy black enamel paint in the preferred embodiment.

The bottom surface of the lower plate 18 is coated with a thin metalized Mylar or metalized Lexan 22. Metalized Lexan, about 0.015" thick is preferred. Again, this is in order to achieve maximum reflectivity to light. On the other hand, the top surface 20 of the lower plate 18 is coated with a black finish, which is a glossy black enamel paint in the preferred embodiment.

The physical configuration and the coatings or finishes applied to the surfaces of the two plates 12 and 18 maximize the stability of the air caught between the two plates 12 and 18. The upper plate 12, itself, consists of a thirty-thousandths inch thick brass circular plate, being somewhat convex in shape. The alloy of brass used in the preferred embodiment is 30% zinc and 70% copper. The lower plate 18 also consists of thirty-thousandths inch brass which is 30% zinc and 70% copper in composition, and has the same overall size and shape as the upper plate 12. Since the two plates 12 and 18 consist of a material which is highly conductive to heat, they act as heat sinks for the air gap in between the two plates. This provides a very stable region of air having a very low gradient of heat distribution. In addition, since the two plates 12 and 18 consist of electrically conductive metallic material, and are electrically insulated from each other and from ground, as discussed below, they both pick up an electrical static charge of the same polarity. This same polarity electrical charge tends to create a pocket of very stable air between the two plates 12 and 18, such that outside air, even when a wind is blowing, does not interfere with the stable region of air trapped between the two plates.

Located in the very center of this highly stable region of trapped air is a temperature sensing element 24. In the preferred embodiment the temperature sensing element 24 preferably comprises a thermistor. The thermistor 24 is held in place by a rubber washer 28, and is connected to an electrical cable 26 which connects the thermistor's resistance value to a remote location where the temperature is sensed by a remote set of electronics. The thermistor 24, the cable 26, and the remote electronics are all well known in the prior art.

Alternatively, the temperature sensing element 24 may be a thermocouple or a platinum resistor.

Figure 3:
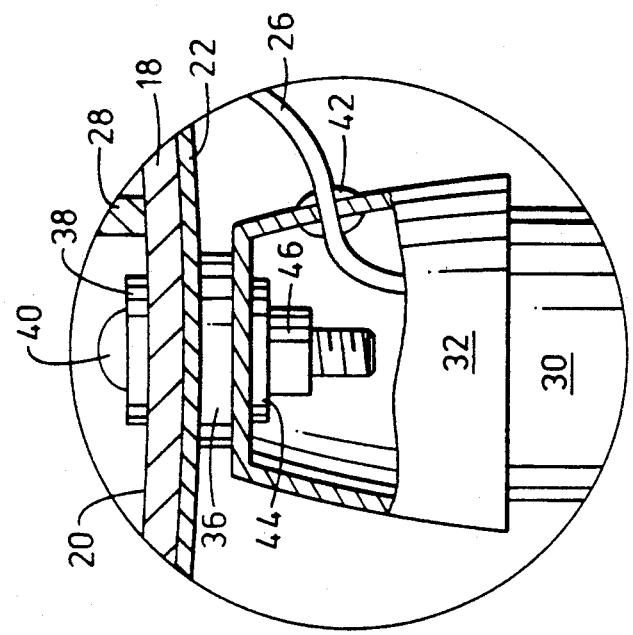
FIG. 3 is another enlarged view of a portion of FIG. 1, showing construction details in partial cross-section of the center mounting hardware.

The method of mounting the two disks 12 and 18 is critical in this invention. The two disks must be electrically insulated from one another, and also from ground potential. Therefore a series of mounting nuts and bolts which hold the two disks apart from one another is employed, designated as 34, and such nuts and bolts must be made of electrically insulative material. In the preferred embodiment, such nuts and bolts are made of nylon. Another view of this arrangement is shown in FIG. 4, which is a bottom view that shows more detail as to the location of the nylon nuts and bolts 34. To hold the entire assembly off the ground, a one and one-half inch PVC pipe 30 is employed as a mounting post to support the entire temperature monitor assembly. The PVC pipe 30 can be mounted vertically, at which point it would connect at its top to a PVC pipe end cap 32. The top of the end cap 32 has a hole in its center, such that a nylon bolt 40 can run through the hole and hold the lower plate 18 to the end cap 32. The exterior details of this arrangement are best shown in FIG. 2, and the interior details of this arrangement are best shown in FIG. 3. On top of the end cap 32 rests a rubber washer 36 which acts as a shock absorber for the assembly. On the opposite side of the lower plate 18, is a nylon washer 38 which the nylon bolt 40 is tightened against. In the interior of the PVC pipe end cap 32, another nylon washer 44 is positioned such that nylon nut 46 is tightened against nylon washer 44, thus holding the nylon bolt 40 in place. The electric cable 26 goes through the lower plate 18 and also through the wall of the PVC pipe and cap 32. At the locations where the electrical cable 26 goes through these surfaces, there are rubber grommets 42 which insulate the electric cable and protect it from a certain amount of vibration.

In summary, numerous benefits have been described which result from employing the concepts of the invention. The device 10 is useful for monitoring air temperature by achieving a stable and relatively constant mass of air which surrounds the actual temperature sensor. The air temperature monitor is somewhat convex in shape to achieve greater accuracy in obtaining air temperature readings. By having a relatively narrow air gap between the parallel plates, it is somewhat easier to trap air in the gap between the two plates. Aiding the trapping of that body of air, is the fact that the two plates are electrically conductive and will pick up an electrical charge from the atmosphere because they are also insulated from each other and from ground. Once they pick up this electrical charge, they tend to keep out any new air blowing through the gap, including during periods where there is a high wind.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. An air temperature monitor, comprising:
   (a) first and second convex plates mounted in a parallel, spaced-apart relationship, said first and second convex plates accumulating an electrical charge from ions in the air which tends to stabilize the air existing between said first and second convex plates;
   (b) said first plate including:
       (1) an outer layer comprising a thin layer of mirrored material;
       (2) a middle layer comprising an electrically conductive material; and
       (3) an inner surface comprising a black material;
   (c) said second plate including:
       (1) an inner surface comprising a black material;
       (2) a middle layer comprising an electrically conductive material; and
       (3) an outer layer comprising a thin layer of mirrored material;
   (d) an electrical temperature sensing device, said temperature sensing device being located between said first and second plates and near the center of said plates, whereby said temperature sensing device measures the temperature of relatively stable air which exists between said first and second convex plates;
   (e) electrically non-conductive mounting means, said mounting means being disposed so as to hold said first and second plates in their spaced-apart relationship, said mounting means also being disposed so as to hold said temperature sensing device between said first and second plates;
   (f) means for mounting said first and second plates above ground level, said means consisting of electrically non-conductive material; and
   (g) means for carrying electrical signals from said temperature sensing device to a remote location, said means comprising electrical conductors which are electrically insulated from each other and from ground potential.

2. An air temperature monitor as recited in claim 1, wherein the convex, parallel plates are circular in shape.

3. An air temperature monitor as recited in claim 2, wherein the convex, parallel plates are approximately eight to twelve inches in diameter.

4. An air temperature monitor as recited in claim 1, wherein the convex, parallel plates are spaced-apart by a gap of substantially one inch at its narrowest distance, which is around the outer edges of said convex, parallel plates.

5. An air temperature monitor as recited in claim 1, wherein the middle layer which consists of electrically-conductive material of said convex, parallel plates comprises 0.030 inch thick brass, 30% zinc and 70% copper.

6. An air temperature monitor as recited in claim 1, wherein said thin layers of mirrored material of said convex, parallel plates consist of metallized Mylar laminate.

7. An air temperature monitor as recited in claim 1, wherein said layers of mirrored material of said convex, parallel plates consist of metallized Lexan laminate.

8. An air temperature monitor as recited in claim 1, wherein said surfaces of black material of said convex, parallel plates consist of glossy black, enamel paint.

9. An air temperature monitor as recited in claim 1, wherein said electrical temperature sensing device consists of a thermistor.

10. An air temperature monitor as recited in claim 1, wherein said electrical temperature sensing device consists of a thermocouple.

11. An air temperature monitor as recited in claim 1, wherein said electrical temperature sensing device consists of a Platinum Resistor Temperature Detector element.

12. An air temperature monitor as recited in claim 1, wherein said electrical temperature sensing device consists of an electronic temperature sensing element.

* * * * *

UNITED STATES PATENT AND TRADEMARK OFFICE
CERTIFICATE OF CORRECTION

PATENT NO. : 5,141,332

DATED : August 25, 1992

INVENTOR(S) : David M. Bergstein

It is certified that error appears in the above-identified patent and that said Letters Patent is hereby corrected as shown below:

Column 5, claim 1, lines 47 and 48, "electricallyconductive" should be deleted and replaced with --electrically conductive--.

Column 5, claim 1, lines 52 and 53, "electricallyconductive" should be deleted and replaced with --electrically conductive--.

Signed and Sealed this

Seventh Day of September, 1993

*Attest:*

BRUCE LEHMAN

*Attesting Officer*    *Commissioner of Patents and Trademarks*